(12) United States Patent
Adan et al.

(10) Patent No.: US 7,227,511 B2
(45) Date of Patent: Jun. 5, 2007

(54) METHOD FOR ACTIVATING AN APPLICATION IN CONTEXT ON A REMOTE INPUT/OUTPUT DEVICE

(75) Inventors: Manolito E Adan, Woodinville, WA (US); Corey M Ladas, Bellevue, WA (US); William H Vong, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 874 days.

(21) Appl. No.: 10/029,251

(22) Filed: Dec. 28, 2001

(65) Prior Publication Data

US 2002/0067338 A1 Jun. 6, 2002

Related U.S. Application Data

(63) Continuation-in-part of application No. 09/749,445, filed on Dec. 28, 2000, now Pat. No. 6,917,373, and a continuation-in-part of application No. 09/556,982, filed on Apr. 24, 2000, now Pat. No. 7,030,837.

(51) Int. Cl.
 *G09G 5/00* (2006.01)
(52) U.S. Cl. .................................. 345/2.1; 702/188
(58) Field of Classification Search ............ 345/3, 345/1.1, 2.3, 3.1, 502, 717, 2.1, 733, 749, 345/750, 751, 505, 169; 709/232, 238, 208, 709/217; 710/33; 713/201; 358/426.12; 707/3; 700/65, 66; 702/188; 715/753
See application file for complete search history.

(56) References Cited

U.S. PATENT DOCUMENTS

| 5,208,745 | A |  | 5/1993 | Quentin et al. |
| 5,555,157 | A |  | 9/1996 | Moller et al. |
| 5,727,155 | A | * | 3/1998 | Dawson ................ 709/205 |
| 5,762,553 | A |  | 6/1998 | Takasugi et al. |
| 5,818,361 | A |  | 10/1998 | Acevedo |
| 5,844,553 | A | * | 12/1998 | Hao et al. ................ 345/733 |
| 5,933,822 | A | * | 8/1999 | Braden-Harder et al. ...... 707/5 |

(Continued)

FOREIGN PATENT DOCUMENTS

GB 2241474 A 9/1991

OTHER PUBLICATIONS

Sony Vaio MX Desktop Entertainment, On-line Product Brochure for Models PCV-MX2L5, MXS2TV7, and MX2V7, Sony Marketing (Japan) Inc., Copyright 2000 (printed Oct. 27, 2000 from http://www.sony.co.jp/ProductsPark/Consumer/PCOM/PCV-MX2).

(Continued)

*Primary Examiner*—Richard Hjerpe
*Assistant Examiner*—Abbas Abdulselam
(74) *Attorney, Agent, or Firm*—Banner & Witcoff, Ltd.

(57) ABSTRACT

A computer system is provided including a host computer such as a PC and one or more remote peripheral devices controlled by the host computer for providing status/notification information, applications, system messages, and the like. Software can track the activities/commands of a user. The sequence of activities/commands can be saved and translated into a format that the host computer understands. Responsive to actuation of a button by a user on the remote peripheral device, the host computer can launch directly into the context currently being presented to the user at the remote peripheral device.

33 Claims, 8 Drawing Sheets

U.S. PATENT DOCUMENTS

| | | | |
|---|---|---|---|
| 5,945,897 | A | 8/1999 | Pluymers et al. |
| 5,959,630 | A | 9/1999 | Takeuchi et al. |
| 5,999,169 | A | 12/1999 | Lee |
| 6,112,141 | A | 8/2000 | Briffe et al. |
| 6,112,215 | A | 8/2000 | Kaply |
| 6,126,328 | A * | 10/2000 | Mallory et al. .............. 717/114 |
| 6,191,758 | B1 * | 2/2001 | Lee ........................... 345/2.2 |
| 6,215,474 | B1 | 4/2001 | Shah |
| 6,219,027 | B1 | 4/2001 | Shimizu et al. |
| 6,226,640 | B1 * | 5/2001 | Ostrovsky et al. ............. 707/5 |
| 6,317,141 | B1 | 11/2001 | Pavley et al. |
| 6,337,698 | B1 | 1/2002 | Keely, Jr. et al. |
| 6,341,305 | B2 | 1/2002 | Wolfe |
| 6,363,398 | B1 * | 3/2002 | Andersen ................ 707/103 R |
| 6,381,519 | B1 | 4/2002 | Snyder |
| 6,390,371 | B1 * | 5/2002 | Armga et al. .......... 235/472.01 |
| 6,431,716 | B1 * | 8/2002 | Kusakabe .................... 362/31 |
| 6,438,282 | B1 * | 8/2002 | Takeda et al. ................. 385/16 |
| 6,438,619 | B1 * | 8/2002 | Coman ....................... 709/319 |
| 6,446,111 | B1 | 9/2002 | Lowery |
| 6,484,189 | B1 | 11/2002 | Gerlach, Jr. et al. |
| 6,504,575 | B1 | 1/2003 | Ramirez et al. |
| 6,512,529 | B1 * | 1/2003 | Janssen et al. .............. 345/790 |
| 6,522,309 | B1 | 2/2003 | Weber |
| 6,624,831 | B1 | 9/2003 | Shahine et al. |
| 6,661,435 | B2 | 12/2003 | Nason et al. |
| 6,686,936 | B1 | 2/2004 | Nason et al. |
| 6,694,306 | B1 * | 2/2004 | Nishizawa et al. ............ 707/3 |

OTHER PUBLICATIONS

Toshiba Infinia 7130, Product Specifications and photographs of product, Toshiba America Information Systems Inc., Apr. 4, 2000.
Screen-print of Corel WordPerfect 8 Tools/Settings/Display dialogue box, © 1997.

* cited by examiner

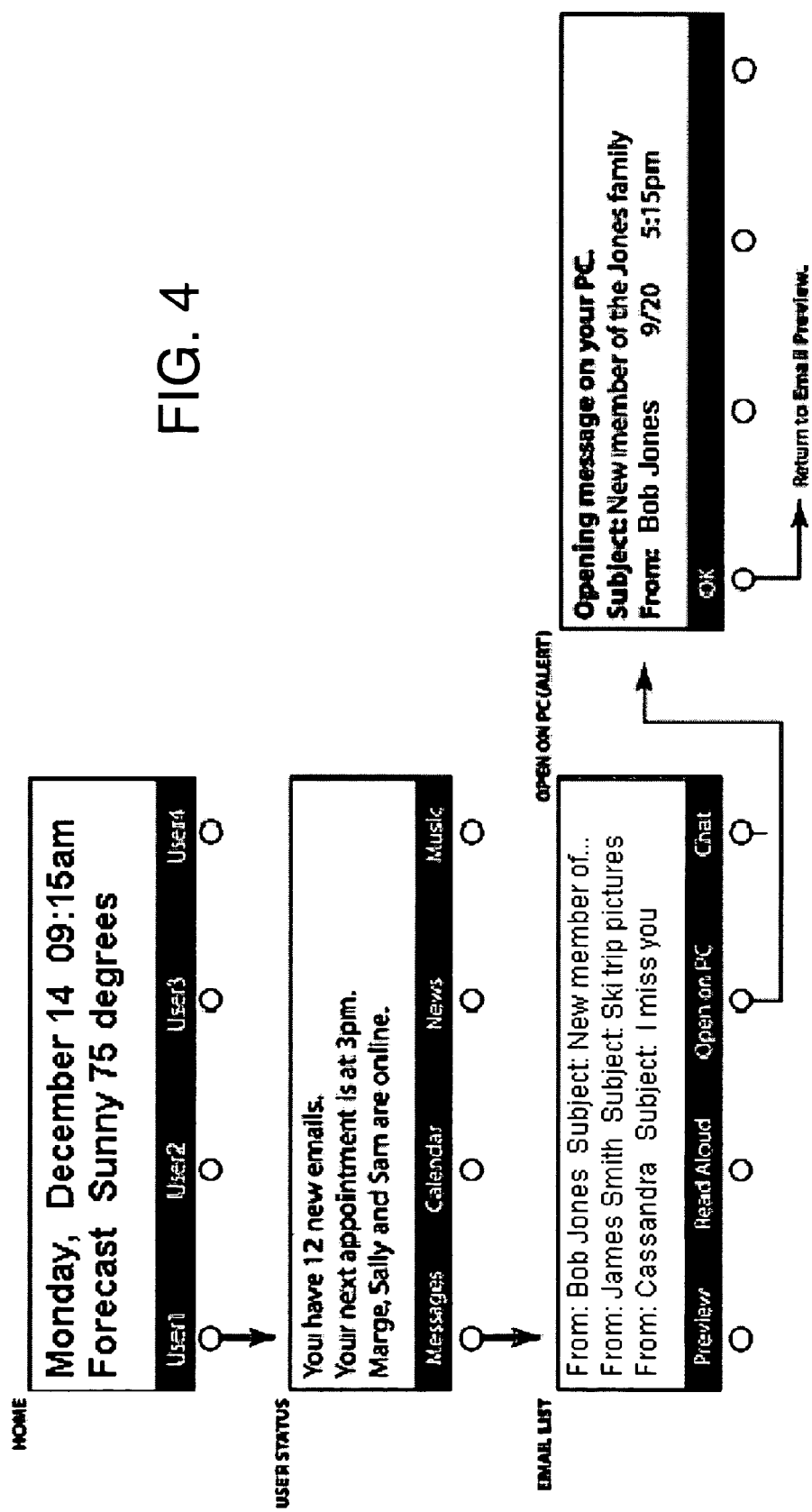

METHOD FOR ACTIVATING AN APPLICATION IN CONTEXT ON A REMOTE INPUT/OUTPUT DEVICE

CROSS REFERENCE TO RELATED APPLICATIONS

This application is a continuation-in part of U.S. patent application Ser. No. 09/556,982 filed Apr. 24, 2000 now U.S. Pat. No. 7,030,837 and entitled "Auxiliary Display Unit For a Computer System", and a continuation-in part of U.S. patent application Ser. No. 09/749,445 filed Dec. 28, 2000 now U.S. Pat. No. 6,917,373, both of which are herein incorporated by reference.

FIELD OF THE INVENTION

Aspects of the present invention are directed generally to apparatus and methods for a computer network including a host computer and one or more remote peripheral devices. More particularly, aspects of the present invention relate to activating an application on the host computer that is the source of the data or notification being previewed at the remote peripheral device.

BACKGROUND OF THE INVENTION

In existing computer systems, a single monitor or other type of display unit is connected to a system bus via an interface, such as a video adapter. The system bus couples the monitor to the central processing unit (CPU) of the host computer. The host computer executes instructions requesting that information be retrieved from system memory and sent over the system bus to the display monitor for display.

One known system provides a computer network having a common CPU that can be shared among multiple display terminals and keyboards. In this system, the display terminals are dumb terminals under the control of the CPU. Such a system is typically set up for use by multiple independent users. The advantage of such a system is that the CPU can be centrally located out of sight and away from each of the user's terminals. Thus, space can be freed up at a user's workstation. Another advantage is that all the applications can be stored in a single location rather than having to be installed separately for each user. User display terminals in this type of system suffer the shortcomings discussed below.

Computer operating systems typically run multiple applications concurrently and also maintain multiple applications open. When multiple applications are active or open, various regions of the monitor's display screen provide information regarding or space dedicated to the active applications. For example, a task bar and status notification area typically occupy reserved sections of the display screen. Email and printer status/notification usually is represented as a small icon on the task bar. Also, multiple active applications, for example a spreadsheet application and a word processing application, may occupy different sections of the screen. A transient system message may pop up in a dialog box overlaying an active application. Additionally, if a user inserts a compact disc (CD) into a CD player coupled to the computer system, a separate soft user interface (UI) applet is launched on top of the active application(s) taking up more display space on the display screen. Typically, to recover the primary display screen real estate, the user immediately minimizes the applet window in order to continue working on an underlying active application such as a word processing application.

As is readily apparent from the above description of a typical computer system, substantial portions of the display screen may be occupied by other active applications, dialog boxes, task bars and the like cluttering the display screen and preventing the user from making the most of the display screen for an active application. For example, the user may not want the display screen to show status or notification information or share the display screen area with certain applications. For instance, the user may want to leave substantially all the display screen area for a particular application(s) with which he is working. Further, notifications and dialog boxes often can disrupt or distract a user attempting to focus on a specific application. Thus, there is a need to provide users with the ability to efficiently use and/or manage the display screen of the monitor while still being able to view the status of other applications and receive messages about other applications, without encroaching on the display screen area. The display terminals in the computer network described above are controlled independently. Consequently, one display terminal cannot help to alleviate the display real estate problems associated with a second terminal.

Another disadvantage with existing computer systems is that status/notification information cannot be viewed when the display monitor is off or in a screen saver mode, or when the host computer is off. A select few newer operating systems include "hibernate" or "sleep" modes where the host computer periodically wakes up and checks status, for example the computer may check whether an email has been received. Thus, the status/notification functionality is not always available to the user except in the few systems where the occurrence of an event (e.g., receipt of an email) wakes the system up to indicate the status. Typically in this instance, the system periodically provides an indication of notification/status to the user, thus not always providing the indication on the display monitor. Accordingly, there is a need to provide a system in which a user may be able to view status/notification information at all times irrespective of the power status of the main computer.

SUMMARY OF THE INVENTION

Aspects of the invention include providing a remote peripheral device with a user interface, such as an auxiliary display unit, in a computer system in addition to a main or primary display unit in order to display certain information normally displayed by the main display unit. Further aspects of the invention involve allowing a user to activate an application that is the source of the data or notification currently being previewed at a remote peripheral device. Data representing the context of the remote peripheral device is preserved and, based on such data, the source application can be launched at the host computer (e.g., PC) that is "serving" (i.e., acts as a server to) the remote peripheral device.

The present invention is directed to one or more remote peripheral devices for use in a computer system. According to one aspect of the invention, display information normally associated with a task bar or "system tray" in an operating system (OS) may be displayed on at least one remote peripheral device's auxiliary display unit rather than the main display unit. Alternatively, such display information may be displayed on the main display unit and at least one auxiliary display unit. Illustrative types of information displayed on an auxiliary display unit of a remote peripheral device can include notifications of events, such as email events, printer events or calendar events, system messages such as dialog box notifications of system events, and date and time information such as a clock. Display information received from separate applications such as stock tickers, weather and traffic reports may also be directed to a remote peripheral device.

According to one aspect of the present invention, software can track the activities/commands of a user. The sequence can be saved after the activities/commands are translated into a format that the host computer (e.g., desktop PC or host PC) understands. In a further aspect of the invention, a user may press a button on the remote peripheral device that causes the host computer to launch directly into the context currently being presented to the user at the remote peripheral device. In another further aspect of the invention, the host computer could prompt the user to select a single command that causes the computer to launch directly into the context currently being presented to the user.

According to another aspect of the invention, the remote peripheral device is a separate stand-alone unit that the host computer controls by way of wireless or wired networks such as Ethernet, RF (radio frequency), IR (infrared) or power line carrier. In yet another aspect of the invention, a remote peripheral device may have an auxiliary display unit including an LCD (liquid crystal display), LED (light emitting diode) or EL (electro luminescent) display panel or a monitor type display of any size from a miniature size monitor substantially smaller than the main display monitor to a TV size monitor larger than the main display monitor. A remote peripheral device may be dedicated to a single functionality such as only displaying notification of an email or it may display multiple functionality.

These and other novel advantages, details, embodiments, features and objects of the present invention will be apparent to those skilled in the art from following the detailed description of the invention, the attached claims and accompanying drawings, listed herein, which are useful in explaining the invention.

BRIEF DESCRIPTION OF THE DRAWINGS

The foregoing summary of the invention, as well as the following detailed description of illustrative embodiments, is better understood when read in conjunction with the accompanying drawings, which are included by way of example, and not by way of limitation with regard to the claimed invention.

FIG. 4 shows the flow on a display panel of a remote peripheral device according to an illustrative embodiment of the present invention.

DETAILED DESCRIPTION OF PREFERRED EMBODIMENTS

The present invention relates to a computer system including a host computer such as a PC (personal computer) and one or more remote peripheral devices controlled by the host computer for providing status/notification information, applications, system messages, and the like. The remote peripheral devices may connect to the Internet by way of the host computer as a gateway. In certain implementations, the host computer may include all the intelligence for the various application and the remote peripheral devices will serve as basic I/O devices such as an LCD, TV output, buttons, speakers, microphones, etc. In addition, the remote peripheral devices according to the present invention may be practiced with PCs, hand-held devices, multiprocessor systems, microprocessor-based or programmable consumer electronics, network PCs, minicomputers, mainframe computers, and the like, which can be found in various environments including home or office environments.

Although not required, portions of the invention may be described in the general context of computer-executable instructions, such as program modules. Generally, program modules include routines, programs, objects, scripts, components, data structures, etc. that perform particular tasks or implement particular abstract data types. Moreover, those skilled in the art will appreciate that the invention may be practiced with any number of computer system configurations including, but not limited to, distributed computing environments where tasks are performed by remote processing devices that are linked through a communications network. In a distributed computing environment, program modules may be located in both local and remote memory storage devices.

Figure 1:
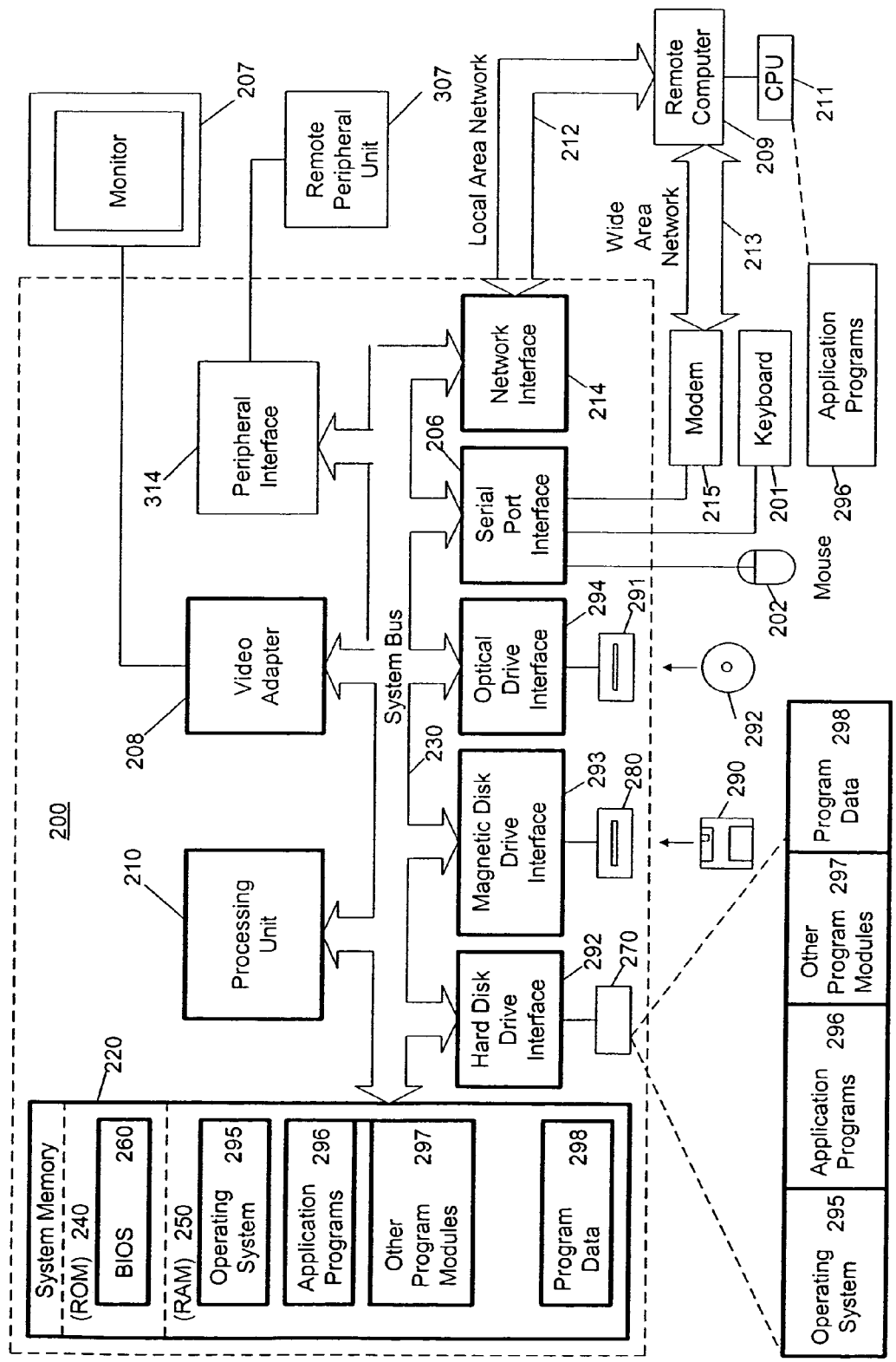
FIG. 1 shows a general-purpose computer system that may be used with a remote peripheral device in accordance with embodiments of the present invention.

FIG. 1 is a schematic diagram of a computing environment with which the present invention may be implemented. The present invention may be implemented within a general purpose-computing device in the form of a conventional personal computer 200, including a processing unit 210, a system memory 220, and a system bus 230 that couples various system components including the system memory to the processing unit 210. The system bus 230 may be any of several types of bus structures including a memory bus or memory controller, a peripheral bus, and a local bus using any of a variety of bus architectures. The system memory includes read only memory (ROM) 240 and random access memory (RAM) 250.

A basic input/output system 260 (BIOS), containing the basic routines that help to transfer information between elements within the personal computer 200, such as during start-up, is stored in ROM 240. The personal computer 200 further includes a hard disk drive 270 for reading from and writing to a hard disk, not shown, a magnetic disk drive 280 for reading from or writing to a removable magnetic disk 290, and an optical disk drive 291 for reading from or writing to a removable optical disk 292 such as a CD ROM or other optical media. The hard disk drive 270, magnetic disk drive 280, and optical disk drive 291 are connected to the system bus 230 by a hard disk drive interface 292, a magnetic disk drive interface 293, and an optical disk drive interface 294, respectively. The drives and their associated computer-readable media provide nonvolatile storage of computer readable instructions, data structures, program modules and other data for the personal computer 200.

Although the exemplary environment described herein employs a hard disk, a removable magnetic disk 290 and a removable optical disk 292, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROMs), and the like, may also be used in the exemplary operating environment.

A number of program modules may be stored on the hard disk, magnetic disk 290, optical disk 292, ROM 240 or RAM 250, including an operating system 295, one or more application programs 296, other program modules 297, and program data 298. A user may enter commands and information into the personal computer 200 through input devices such as a keyboard 201 and pointing device 202. Other input devices (not shown) may include a microphone, joystick, game pad, satellite dish, scanner, or the like. These and other input devices are often connected to the processing unit 210 through a serial port interface 206 that is coupled to the system bus, but may be connected by other interfaces, such as a parallel port, game port or a universal serial bus (USB). A monitor 207 or other type of main display unit is also connected to the system bus 230 via an interface, such as a video adapter 208. Also, coupled to the system bus 230 is a remote peripheral device 307 via a peripheral interface 314. The peripheral device may be a peripheral input/output (i/o) device such as an auxiliary display unit (e.g., LCD), microphone, speakers, TV output, combinations of these elements, etc.

The peripheral interface 314 can couple the processing unit 210 to the remote peripheral device 307 in various ways. It should be understood that the terms "couple," "coupling", "coupled" and grammatical variations thereof as used herein mean all known wired and wireless connections. Interfaces between the remote peripheral device 307 and the personal computer 200 include, but are not limited to, an expansion card, standard communication interfaces such as serial, parallel, 1394, or USB (universal serial bus) connectors, IR, Ethernet, RF or Power Line Carrier.

The personal computer 200 may operate in a networked environment using logical connections to one or more remote computers, such as a remote computer 209. The remote computer 209 may be another personal computer, a server, a router, a network PC, a peer device or other common network node, and typically includes many or all of the elements described above relative to the personal computer 200, although only a memory storage device 211 has been illustrated in FIG. 1. The logical connections depicted in FIG. 1 include a local area network (LAN) 212 and a wide area network (WAN) 213. Such networking environments are commonplace in offices, enterprise-wide computer networks, intranets and the Internet.

When used in a LAN networking environment, the personal computer 200 is connected to the local network 212 through a network interface or adapter 214. When used in a WAN networking environment, the personal computer 200 typically includes a modem 215 or other means for establishing a communications over the wide area network 213, such as the Internet. The modem 215, which may be internal or external, is connected to the system bus 230 via the serial port interface 206. In a networked environment, program modules depicted relative to the personal computer 200, or portions thereof, may be stored in the remote memory storage device. It will be appreciated that the network connections shown are exemplary and other means of establishing a communications link between the computers may be used.

The remote peripheral device 307 provides information under the control of the host computer (e.g., PC). The host computer peripheral interface 314 may be an RF link module for communicating with the remote peripheral device 307. The host computer peripheral interface 314 can be adapted for an expansion card and standard communication interfaces known in the art such as serial, parallel, 1394, or USB, IR, Ethernet, RF or Power Line Carrier.

Figure 2:
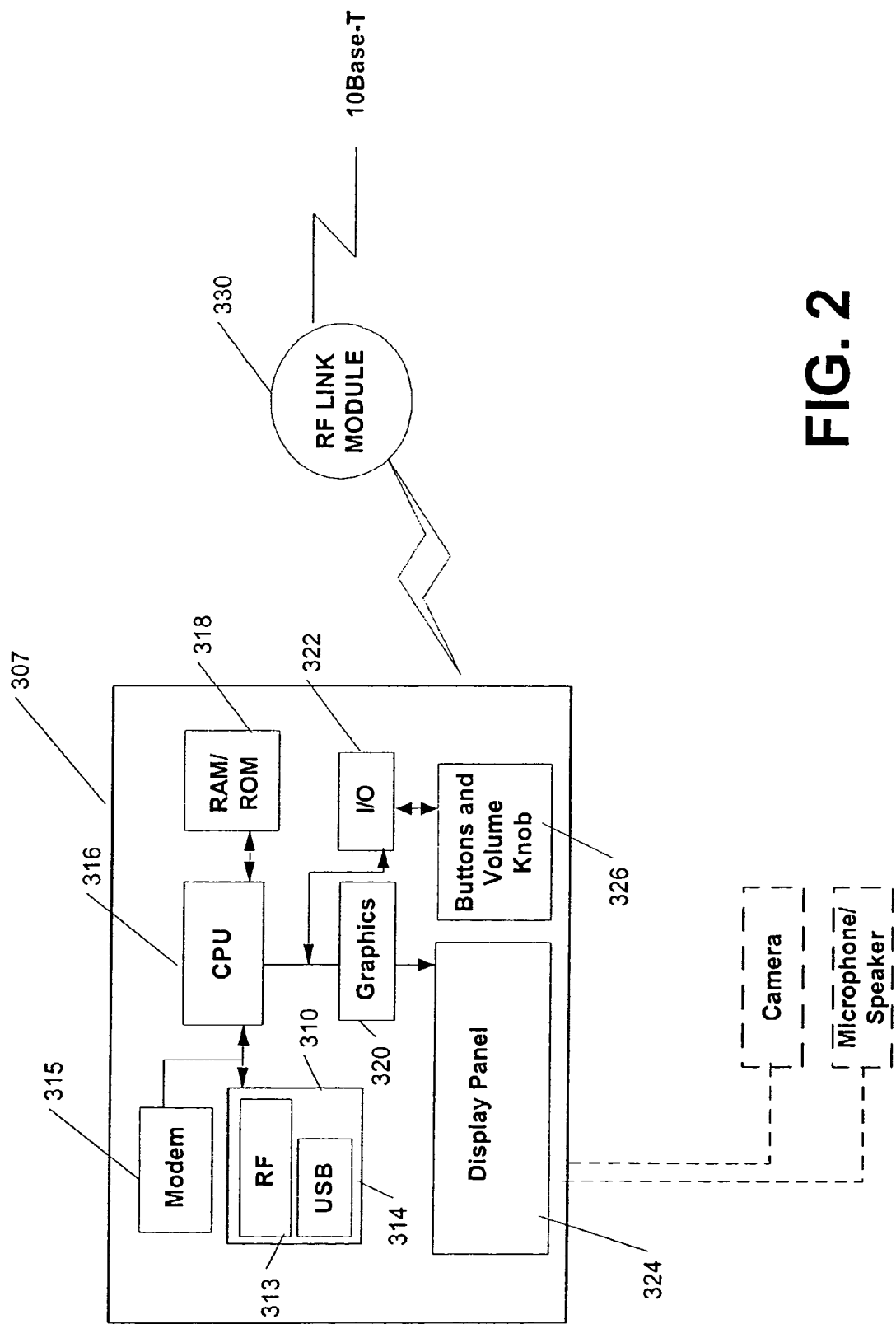
FIG. 2 shows a block diagram of a remote peripheral device according to an illustrative embodiment of the present invention.

In an illustrative implementation of the invention, the remote peripheral device 307 may include an auxiliary display unit, which displays information under the control of the host computer. FIG. 2 shows an exemplary remote peripheral device 307 including an auxiliary display unit. In the illustrative embodiment of FIG. 2, the remote peripheral device includes an interface 310 including an RF interface 313 and a USB interface 314 for communicating with the host PC. Particularly, the RF interface 313 communicates with the host computer by way of the RF link module 330. The RF link module 330 may be coupled to a server by way of a standard wired connection, such as 10Base-T, 100Base-T, 1000Base-T, etc. When coupled to a server, the host computer may be one of plural host computers coupled to a server. Alternatively, the RF link module 330 may be external to the host computer, and within broadcast range of the RF interface 313 of the remote peripheral device 307. In this arrangement, a standard wired connection, such as 10Base-T, 100Base-T, or 1000Base-T can be used to provide signaling between the RF link module 330 and the host computer.

The interface 310 is coupled to a CPU 316. The CPU 316 is coupled to local memory such as RAM/ROM 318. The CPU 316 receives the commands through the interface 310 from the host PC and interacts with local memory, e.g., RAM/ROM 318 as necessary and causes the appropriate commands to be directed to a graphics module 320, which in turn generates an appropriate display to be shown on the display panel 324. Also, the CPU 316 is coupled to an I/O module 322, which can receive user input through buttons and volume knob 326, such as by way of a user turning the volume knob or actuating one of the buttons. The CPU 316 may output information through the I/O module 322. For example, audio may be output or a button may be illuminated. It should be understood that buttons and volume knobs are illustrative input/output devices and that the present invention is not so limited. For example, the I/O module 322 and graphics module 320 may both be connected to the display panel 324, where inputs may be received by way of a touch screen. Further, I/O module 322 may be connected to a microphone, speakers, an IR (infrared) sensor device that can identify a user, a camera, keypad, etc.

Remote peripheral devices may be implemented in many devices including, but not restricted to, various kitchen appliances, communication devices (e.g., cable, satellite, and Internet televisions, satellite or Internet radios, and mobile and landline communication units), security systems, electronic game equipment, electronic picture frames, web companions and Internet appliances. These devices may be fixed or some may be used portably such as a wristwatch or handheld Internet appliance. Further, many elements may be coupled to the I/O module 322 of the remote peripheral device including, but not limited to, a camera and motion sensor (e.g., for a security system), Internet appliances, electronic game equipment, and wireless (e.g., IR and RF)

remote control devices (e.g., for an MP3 player, CD player, Internet appliance, radio, television, electronic game equipment, VCR, etc.).

Figure 3A:
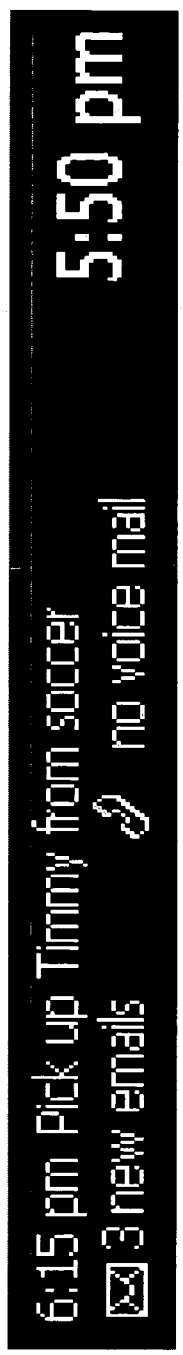
FIGS. 3A-C show information depicted on an auxiliary display of an illustrative remote peripheral device according to embodiments of the present invention.
Figure 3B:
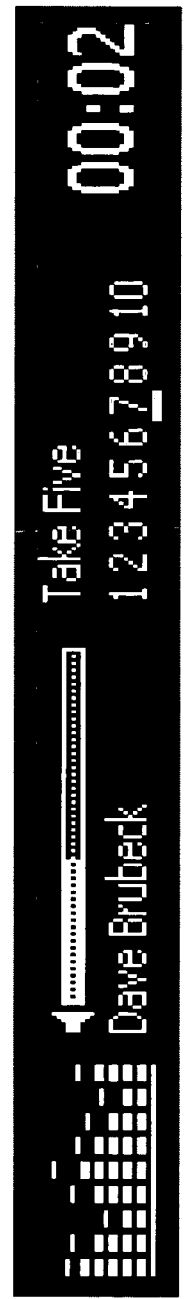
Figure 3C:
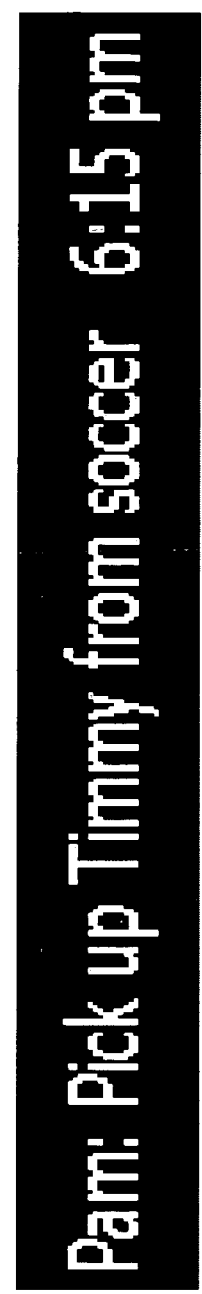

In the illustrative remote peripheral device shown in FIG. 2, a camera and microphone/speaker can be coupled, as shown by the dotted lines, to the remote peripheral device for receiving audio and video input and generating audio and video output. The display panel 324 may be configured to have a touch screen display, a video camera-intercom system, email notification on the display panel in the form of video or text, or audio output by a speaker. The display panel 324 may be a display dedicated for or adapted to display information for an MP3, DVD, CD player, or electronic picture frame coupled directly to the remote peripheral device 307 or the host computer 200. The display panel may be adapted for multiple types of information included, but not limited to, calendar information, number of voice mail messages, number of email messages, time-of-day, and information regarding a multimedia player. Illustrative display panels containing multiple types of information are depicted in FIGS. 3A-C.

In addition as shown in the FIG. 2 embodiment, a modem (e.g., 56 k) 315 may be coupled to the CPU 316 and the interface 310. Responsive to a command received from the host computer 200 or the CPU 316, the modem 315 can connect the remote peripheral device 307 to the Internet or other data communication networks without having to route the information through the host computer. This implementation may be particularly beneficial when multiple Internet connections (e.g., phone lines, DSL, cable-modem, ISDN) are available and in use. Namely, a user of the remote peripheral device may not have to share bandwidth with a user of the main display monitor or another remote peripheral device who accesses the Internet via the host computer. The host computer can send commands instructing the remote peripheral device to initiate its own connection to the Internet. Also, the remote peripheral device may be separately addressable and capable of receiving information directly from the Internet such as "push" type data including stock ticker information, sports scores, news, etc.

The remote peripheral device 307 can be set to receive display information that may have been part of the domain of the main display unit 207 in conventional computer system environments. For example, the responsibility for displaying information regarding separate applications (e.g., stock tickers, weather reports, and traffic reports) may be assigned to one or more remote peripheral devices 307. Also, the remote peripheral device 307 could receive display information normally associated with the task bar, system messages and notification of events (e.g., time, power status, email and messaging notification, printer information, volume control, dialog box notifications of system events etc.) on the main display unit 207. In an illustrative embodiment, the display panel 324 can function as the UI for Internet radio and television, video, "push information", or an MP3 player. The display panel UI may span from simple LED notifications to text-to-speech conversion of incoming email messages, to a full UI with a touch panel interface and a graphics picture frame. Also, the remote peripheral device display panel UI can include one or more of an LCD, TV output, buttons, speakers, microphones, etc A remote peripheral device may be responsible for a single or multiple applications, system messages, notifications and the like. For example, an email, word processing or financial application may appear only on the display panel of the remote peripheral device and not appear on the main display unit. Further, input from a user may be received from an input device coupled to the remote peripheral device, the host computer or both. The host computer can be configured manually or dynamically to route display functionality to the remote peripheral device. In certain configurations, responsibility for an email application may be routed to one or more remote peripheral devices by default.

According to an implementation of a remote peripheral device, when the main display 207 is in a screensaver or off mode or the host computer is not on or in a hibernate mode, sufficient hardware and software functionality can be provided to allow the remote peripheral device to bypass the host computer and connect directly to the server (Internet or local) to operate autonomously, that is perform a specific application such as checking email status. Such a mode of operation can function with external cameras. For example, if a doorbell rings, the user can view who is at the door with a remote peripheral device capable of displaying video images (still and moving). Further, such a remote peripheral device may also display JPEG or other image formats and function as an electronic picture frame.

According to illustrative implementations of the present invention, functionality can be routed to a remote peripheral device in lieu of providing the functionality simultaneously at the host computer. For example, this can occur when the host computer (e.g., host PC or desktop PC) is off, in a hibernate mode or has otherwise assigned functionality to the remote peripheral device. Certain remote peripheral devices will have a smaller and less sophisticated UI when compared to the host computer. In this instance, a user may desire to receive (e.g., view) the information on the richer host computer UI. In other instances, a user may simply be moving to a location proximate to the host computer UI and desire to have the information presented on the remote peripheral device UI presented on the host computer UI.

In the above-described illustrative system, the remote peripheral devices functions as separate, stand-alone devices that a host computer controls by way of wireless or wired networks. Consequently, the user may be remote from the host computer and its main display unit, but still receive notification/status information through a remote peripheral device. The remote peripheral device may include an auxiliary display unit having an LCD (liquid crystal display), LED (light emitting diode) or EL (electro luminescent) display panel or a monitor type display of any size from a miniature size substantially smaller than the main display monitor to a TV size monitor larger than the main display monitor. Information that can be displayed by the remote peripheral device depends on the type of the unit and can range from notification of events such as receipt of email and appointments to information from separate applications.

In certain implementations, the user interface (UI) may be very small and may merely provide notification of an event. In this instance, if a user is notified that he or she has received an email, to read the email, the user may need or desire to walk over to the host computer and view the information on the main display unit. To actually end up at the same context as the remote auxiliary display unit however, the user must go through a series of steps. These steps can include 1) going to the physical host computer; 2) booting up the host computer if not presently active; 3) search for the application which initiated the notification; and 4) drill down to the desired information/data point, for example by way of a series of mouse clicks and/or keyboard entries.

Having to execute a series of steps can be cumbersome and time-consuming and generally inefficient. Indeed, in certain situations, searching for the application that caused the notification to be generated may be difficult as well. For example, the user may be advised of breaking news at their remote peripheral device auxiliary display unit, but may not actually be aware of the source (e.g., URL) of the breaking news. Thus, the user may have to access several different URLs to determine the news source. Hence, the user would have to "replicate" the events/activities carried out to get to the same context point on the host computer browser as the remote peripheral device. Accordingly, in another implementation of the present invention, a system is provided to minimize the steps required to reach the same context point on a host computer, such as a desktop PC or host PC, which has already been reached on a remote peripheral device. This implementation allows a simple, fast user interface to the desired data and involves software that tracks the user activities/commands and saves the sequence after translating the activities/commands into a format that the host computer and its browser understands.

According to an illustrative implementation of the present invention, the steps required to reach a context on a host computer such as a desktop PC or host PC can be aggregated so as to be reduced down to a single query. The single query may be activated by, for example, actuation of a single activation button. The query may be formed by remembering each of the activations from the UI of the remote peripheral device and building a query that is understandable by the host computer and its appropriate application (e.g., browser).

The single click activation at the host computer may include carrying out several steps, with the final step arriving at the context. In an illustrative embodiment, the user interface in the remote peripheral device may be considered as a micro-browser interface and require several steps to check email messages.

Figure 6:
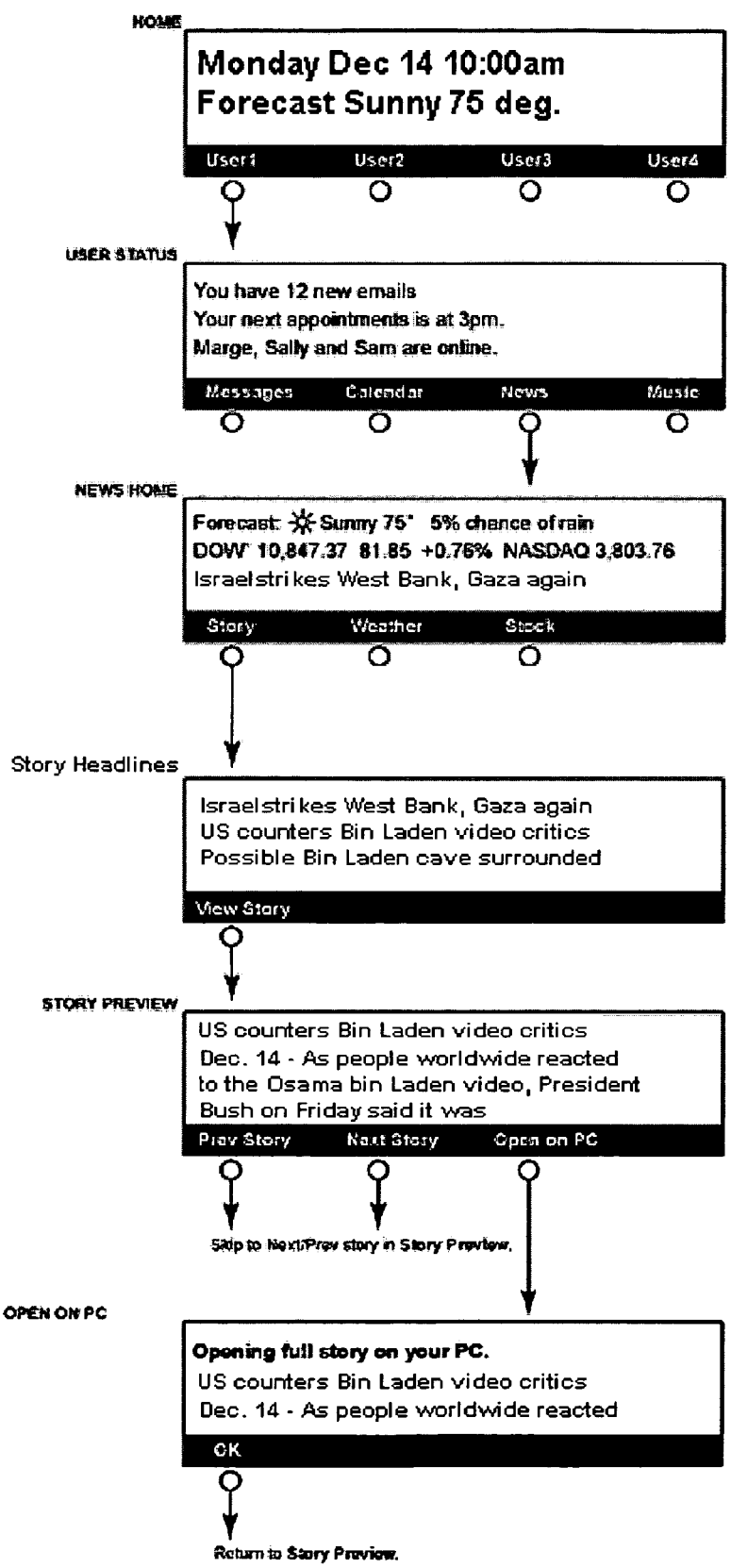
FIG. 6 shows the flow on a display panel of a remote peripheral device according to another illustrative embodiment of the present invention.

FIGS. 4 and 6 show the flow on a display panel for an exemplary remote peripheral device in illustrative implementations of the invention. A HOME screen of the display panel may display status information such as time, date and weather and soft labels identifying four users (e.g., User1, User2, User3, User4). In an illustrative implementation, color may be used in the UI, where each user is assigned a specific color. The color may be used to notify the user when new information for him or her is present. In this instance, a button below the user's name can light up with an LED matching their assigned color or the background of the display region surrounding their respective name may be illuminated with their assigned color.

Responsive to actuation of the button corresponding to the soft label User1, the soft labels change context to identify the personalized applications for User1 as shown in the user's customized USER STATUS screen depicted in FIG. 4 and FIG. 6. The applications may include, but are not limited to, messages, calendar, news and music. It will be appreciated that content may be customized from within an application on the host computer. Content that can be personalized includes, but is not limited to, the HOME screen, the types of content displayed, the location of the content within the UI and the content of the respective user status.

FIG. 4 is directed to an exemplary email message implementation of the invention. Responsive to actuation of the button corresponding to the soft label Messages, the email message application is launched and an EMAIL LIST screen is displayed on the display panel including a list of emails directed to User1 and four exemplary soft labels, Preview, Read Aloud, Open on PC and Chat, which represent actions selectable by the user. While the illustrative display panel of the EMAIL LIST screen shows three messages, it will be appreciated that other messages may be displayed by scrolling through the message list with an input (not shown), which moves a cursor to highlight a message. For example, actuation of a scrolling button once may result in the highlighting of a second message's author and subject on the list, actuation of the scrolling button a second time may result in highlighting of the author and subject associated with a third message, and actuation of the scrolling button a fourth time can cause the author and subject of a fourth message to appear on the display and be highlighted while removing the author and subject of the first message.

Actuation of the button corresponding to the soft label Open on PC causes a messaging application to be launched on the host computer, which is coupled to the remote peripheral device. The highlighted (selected) message is displayed on the UI associated with the host computer and the context of the user's location is preserved. Also, the OPEN ON PC (ALERT) screen can be provided on the display panel indicating that the highlighted message is being opened on the host computer.

Thus, the illustrative embodiment of FIG. 4 shows four steps associated with an illustrative UI display panel of a remote peripheral device, which may be involved in checking an email message. The steps to check email messages in the FIG. 4 example include: 1) selection of notification name (User1); 2) selection of Messages button; 3) moving the cursor to the desired item in the email list; and 4) displaying the email subject header. According to this implementation of the invention, the accompanying software that drives the UI from, for example, the host computer translates the first three steps carried out by the user into a single query that the messaging application (e.g., Outlook® by Microsoft) on the host computer can understand. Next, the Open on PC option is made available on the remote peripheral device UI, which provides the single point activation. By actuation of the button, the host computer can launch directly into the current context by launching the messaging application, resulting in the selected message from the EMAIL LIST screen being displayed on the display associated with the host computer.

Figure 5:
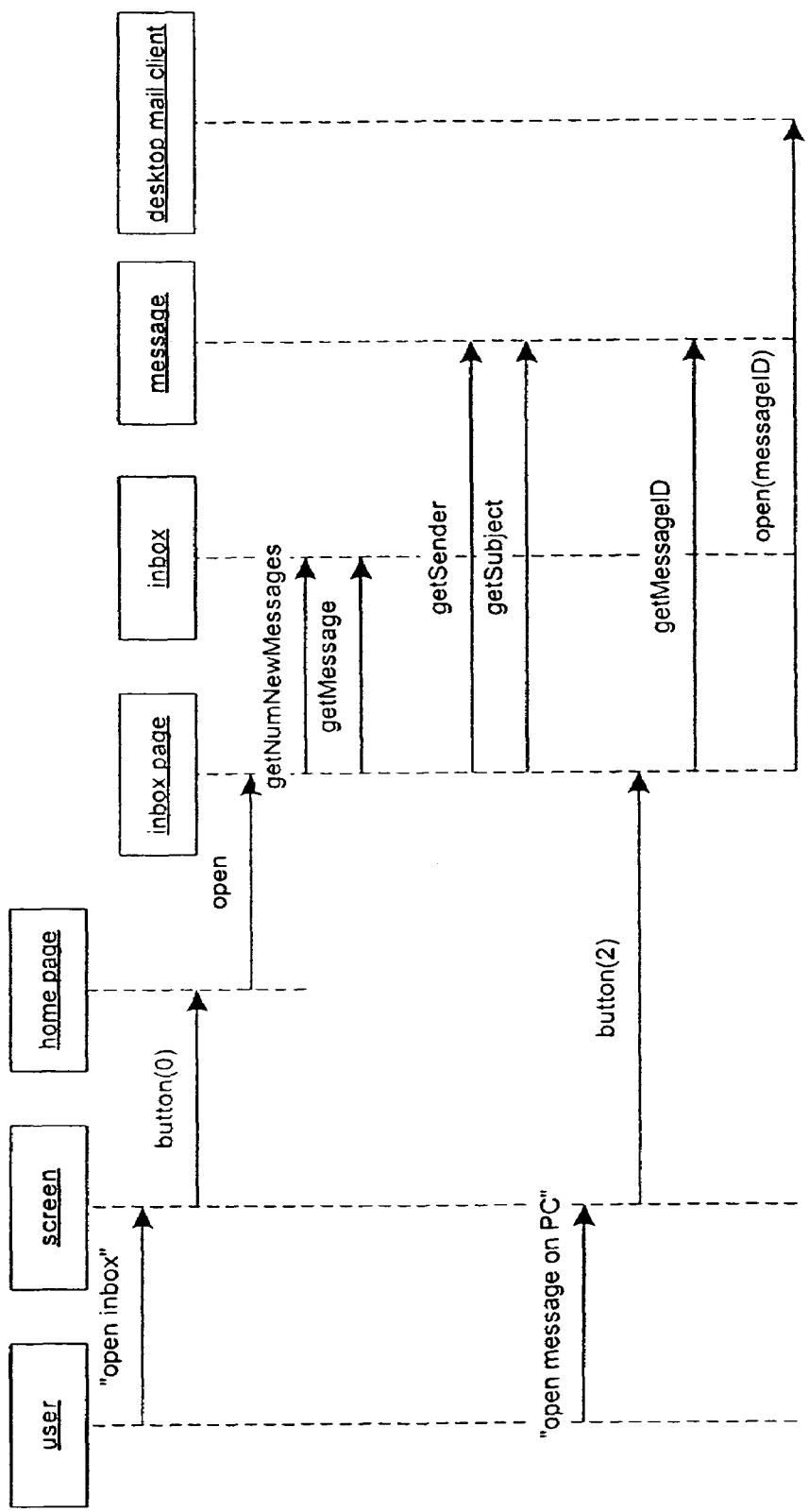
FIG. 5 shows an object sequence diagram in the unified modeling language for an implementation of the illustrative embodiment of FIG. 4.

FIG. 5 shows an object sequence diagram in the unified modeling language depicting the sequence of activities in connection with the illustrative implementation of the invention shown and described in FIG. 4. One skilled in the art of computer programming would readily be able to write code from the unified modeling language to perform the actions shown in FIG. 5. Seven objects are shown in FIG. 5 including user object, screen object, home page object, inbox page object, inbox object, message object, and desktop mail client object. The user object represents the actual user and the screen object is a screen manager, which represents a device driver. The buttons are identified from left to right as buttons 0-3 for purposes of this description.

In FIG. 5, it is assumed that the action of selecting a user (User1, User2, User3, User4) in connection with FIG. 4 has already been performed. On the screen is displayed a USER STATUS page, which may be a user home page. The screen object provides selectable events on the screen including Messages in FIG. 4, corresponding to "open inbox". Upon actuation of the button(0) corresponding to Messages ("open inbox") associated with the home page object, the software can then break down the user action as follows, 1) the inbox page object (EMAIL LIST in FIG. 4) is opened; and 2) the inbox page object retrieves the number of new messages and messages from the inbox object and the sender and subject of the messages from the message object. Upon actuation of the button(2) corresponding to Open on PC ("open message on PC") button associated with the inbox page object, the messageID (e.g., U34379126333532956) for the highlighted message is obtained from the message object and the desktop mail client object opens the message corresponding to the messageID on the desktop PC (i.e., host computer).

The illustrative implementation described with respect to FIG. 5 can be used for a message item that is given a unique ID by the message server. In this implementation, when a leaf-node item is reached in the micro-browser interface, the Open on PC command will become available. The micro-browser can acquire an identification token representing the leaf-node message item. When the user selects "Open on PC" in the micro-browser, the message identification token is fed back into the messaging client to open the associated item on the desktop without requiring the user to navigate through the messaging client's UI. Thus, the same context at the micro browser is presented at the host computer. The content may be the same, less rich or richer, although in most cases it is expected that the host computer UI will be richer than the UI of the remote peripheral device.

In another implementation, which could be used with FIG. 5, the user can navigate to a messaging item that is not directly accessible by a unique id. This may occur when the messaging server does not assign a unique ID to the message. The steps to navigate to the message can be encoded as steps to navigate to the item. For example, open the third item in the second subfolder in the inbox folder of user User1. According to this implementation, the micro-browser accumulates a path through the automation object model of the messaging client as the user narrows her choices to a single leaf-node item (e.g., an email item or calendar appointment). The accumulated object model path represents the identity of a messaging item. When a leaf-node item is reached in the micro-browser interface, the "Open on PC" command will become available. When user presses "Open on PC" in the micro-browser, the object model path is fed back into the messaging client to open the associated item on the desktop (host computer) without requiring the user to navigate through the messaging client's UI.

In another illustrative implementation of the invention shown in FIG. 6, the user may activate a news item on an Internet site (e.g., msnbc.com, cnn.com). Responsive to actuation of the button corresponding to the soft label News, the news application is launched and a NEWS HOME screen is displayed on the display panel including a list of three items: weather forecast, stock ticker and top story and three exemplary soft labels, Story, Weather, and Stock, which represent actions selectable by the user. Responsive to actuation of the button corresponding to the soft label Story, the STORY HEADLINES screen displays three news headlines and one soft label, "View Story". While the illustrative display panel of the HEADLINES screen shows three headlines, it will be appreciated that other headlines may be displayed by scrolling through the headline list with an input (not shown), which moves a cursor to highlight a headline in the same manner as described with respect to the EMAIL LIST screen.

Responsive to actuation of the View Story Button, a STORY PREVIEW screen displays the abstract of the story selected and soft labels Prev Story, Next Story and Open on PC. Actuation of the button corresponding to the soft label Open on PC causes the News application to be launched on the browser of the host computer, which is coupled to the remote peripheral device. This causes the context of the user's location to be preserved and displays the news story to the user on the host computer browser. Also, the OPEN ON PC (ALERT) screen can be provided on the display panel of the remote peripheral unit indicating that the highlighted (selected) news story is being opened on the host computer.

Figure 7:
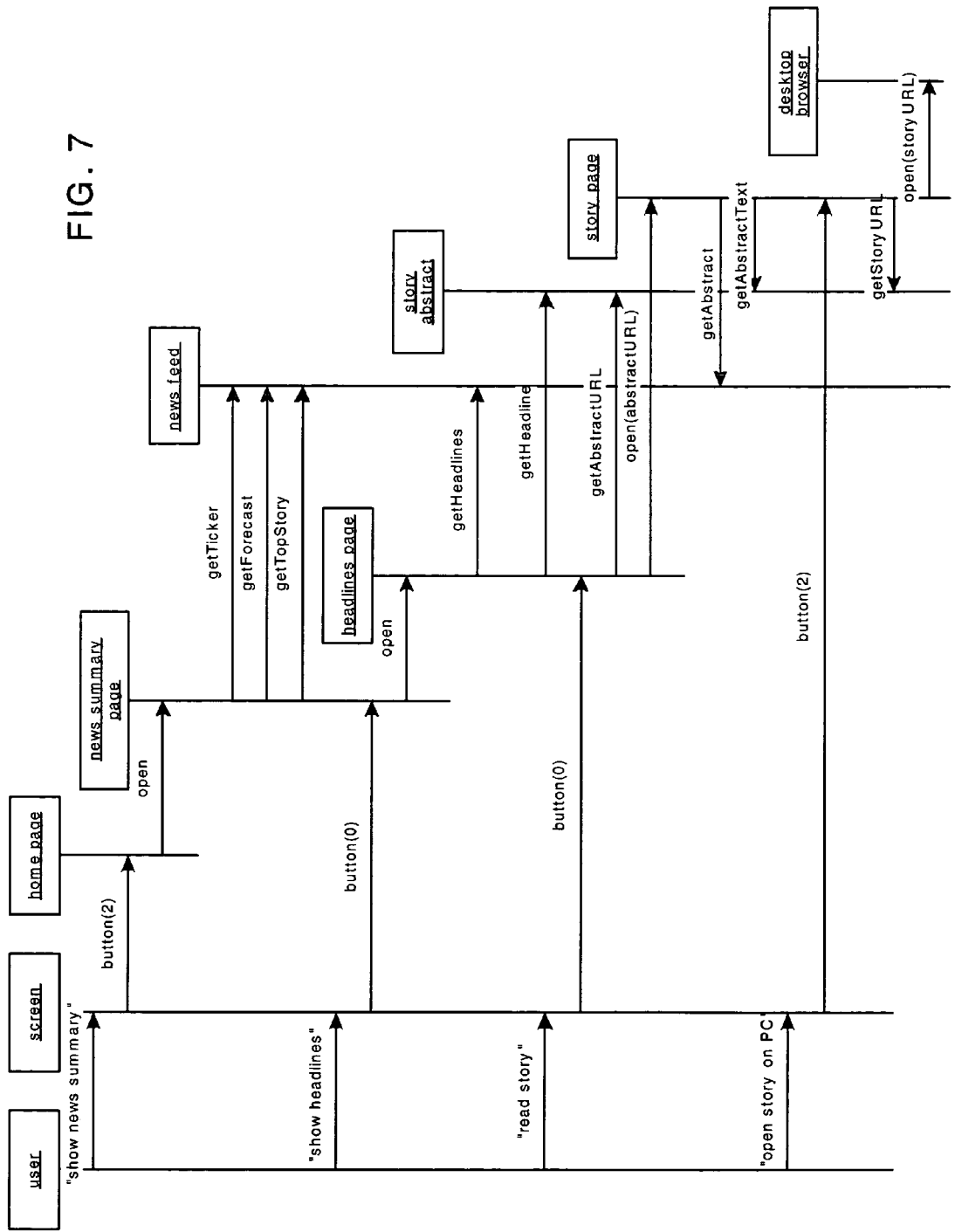
FIG. 7 shows an object sequence diagram in the unified modeling language for an implementation of the illustrative embodiment of FIG. 6.

FIG. 7 shows an object sequence diagram in the unified modeling language depicting the sequence of activities in connection with the illustrative implementation of the invention shown and described in FIG. 6. Nine objects are shown in FIG. 7, user object, screen object, home page object, news summary page object, news feed object, headlines object, story abstract object, story page object and desktop browser object. The user object represents the actual user and the screen object is a screen manager, which represents a device driver. The buttons are identified from left to right as buttons 0-3 for purposes of this description.

Figure 8:
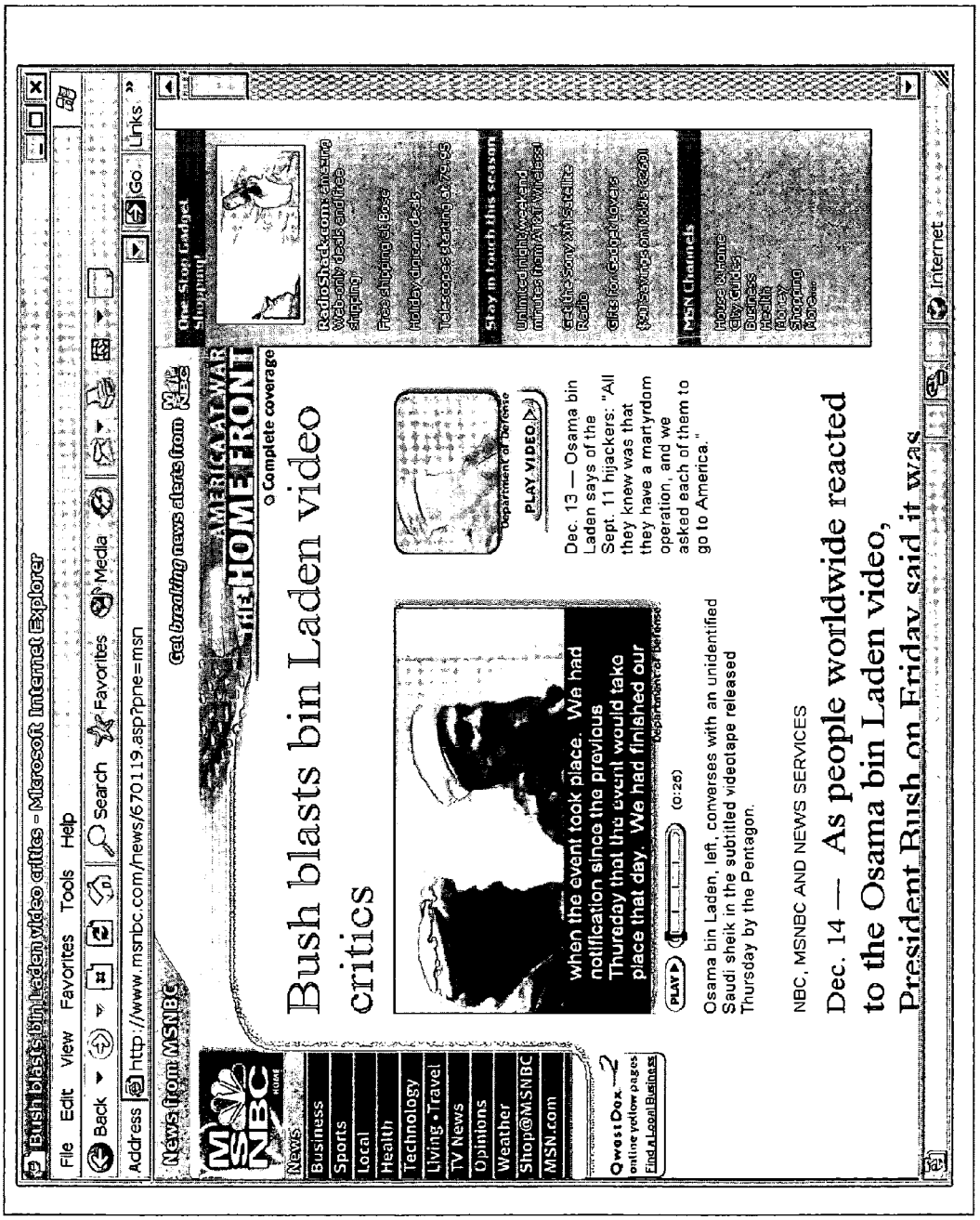
FIG. 8 shows an exemplary display screen on a desktop PC according to the illustrative embodiment of FIG. 6.

In FIG. 7, it is assumed that the action of selecting a user (User1, User2, User3, User4) in connection with FIG. 6 has already been performed. On the screen is displayed a USER STATUS page, which may be a user home page. The screen object provides selectable events on the screen including News in FIG. 6, corresponding to "show news summary inbox". Upon actuation of the button(2) corresponding to News ("show news summary") associated with the home page object, the software can then break down the user action as follows, 1) the news summary page object (NEWS HOME in FIG. 6) is opened; and 2) the news summary page object retrieves the weather forecast, stock ticker, and top story from the news feed object. Next, responsive to actuation of button(0) corresponding to Story ("show headlines") associated with news summary page object, the software breaks down the user action as follows: the headlines page object (HEADLINES in FIG. 6) is opened and the headlines page object retrieves the headlines from the news feed object and story abstract object. Then, responsive to actuation of button(0) corresponding to View Story, the software breaks down the user action as follows: 1) the abstract URL is obtained from the story abstract object; and 2) the story page object opens the abstract URL and gets the abstract and abstract text from the story abstract object. The format of the abstract text may be in XML. XML allows the remote device to render the abstract text to be compatible with smaller displays. Upon actuation of the button(2) corresponding to Open on PC ("open story on PC") button associated with the story page object, the story URL is obtained from the story page object and the desktop browser object opens the browser of the desktop PC to the URL corresponding to the story. The format of the story can be HTML. FIG. 8 shows an illustrative corresponding display screen on the desktop PC upon linking to the final story URL.

Thus, the illustrative implementation in FIGS. 6 and 7 shows a user navigating to a news item via micro-browser interface. In this example, the micro-browser accumulates the user's navigation choices in the form of a URL query string. When the user reaches a leaf-node item (e.g., a news headline, a stock ticker symbol, a city), the query string is considered to be complete and valid, and the "Open on PC" command will become available in the micro-browser's user interface. The query string represents the state of the micro-browser at the time of the "Open on PC" command, namely the user's choices have been captured in a form that the host computer and Internet site can understand. The query string does not necessarily represent the same path that the micro-browser used to retrieve that information. Instead, the query string is an equivalent query that will produce the equivalent result in the desktop browser to reach the same context. The desktop browser can be invoked with the accumulated URL query string, and then can retrieve the selected news item without requiring the user to navigate through the desktop browser's UI.

It will be appreciated that the exemplary implementations of the invention described with reference to FIGS. 4 and 6 are not limited to a desktop PC, but may be applied to other types of remote peripheral devices including a remote peripheral device with a richer UI or less rich UI.

In an alternative implementation of the present invention, an "Open on Other Device" command may be provided where the user can drill down to a next selection option of selecting between opening on host computer or opening on one or more other remote peripheral devices. The other remote peripheral devices available may include remote peripheral devices having the same UI, a less rich UI or a richer UI as the remote peripheral device. In such an implementation, the other remote peripheral devices available may be a function of the physical location of the remote peripheral device. For example, selection of a particular device type can cause the application to be opened on the closest remote peripheral device (e.g., monitor, TV, etc.) of the type selected. Determinations as to locations of devices including GPS, signal strength measurements, etc. are well known in both wired and wireless networks, and thus such implementation would be readily apparent to the skilled artisan. Also, when a particular device type is selected such as a monitor, the remote peripheral device UI can present the user with a selection option as to the available monitors (e.g., kitchen, bedroom, family room).

Although the invention has been defined using the appended claims, these claims are exemplary in that the invention may be intended to include the elements and steps described herein in any combination or sub combination. Accordingly, there are any number of alternative combinations for defining the invention, which incorporate one or more elements from the specification, including the description, claims, and drawings, in various combinations or sub combinations. It will be apparent to those skilled in the relevant technology, in light of the present specification, that alternate combinations of aspects of the invention, either alone or in combination with one or more elements or steps defined herein, may be utilized as modifications or alterations of the invention or as part of the invention. It may be intended that the written description of the invention contained herein covers all such modifications and alterations.

We claim:

1. In a computer system including a host computer, a main display unit and a remote peripheral device having an auxiliary display unit, the remote peripheral device communicating with the host computer, a method comprising:
    providing at the remote peripheral device notification of an event received from a source application at the host computer;
    responsive to a first user input at the remote peripheral device, displaying on the auxiliary display unit information associated with the event;
    forming a query based upon the first user input;
    responsive to a second user input at the remote peripheral device, executing the query to cause the source application to be launched by the host computer;
    displaying on the auxiliary display unit a plurality of first soft labels representing a plurality of applications, including an application associated with the event;
    responsive to actuation of a first button on the remote peripheral device associated with one of the first soft labels representing the application, displaying on the auxiliary display unit a plurality of second soft labels, each second soft label representing a different function within the application, the second soft labels replacing the first soft labels on the auxiliary display unit; and
    responsive to actuation of a second button on the remote peripheral device associated with one of the second soft labels, executing a function within the application on the remote peripheral device,
    wherein the first user input includes actuation of the first button followed by actuation of the second button.

2. The method according to claim 1, wherein the event represents receipt of a message.

3. The method according to claim 2, wherein said executing the query includes displaying the message on the main display unit.

4. The method according to claim 2, wherein the event represents receipt of a calendar message.

5. The method according to claim 2, wherein the information includes subject and author of a message.

6. The method according to claim 1, wherein the notification comprises a visual signal.

7. The method according to claim 1, wherein the notification comprises an audio signal.

8. The method according to claim 1, where the first user input includes plural user inputs.

9. The method according to claim 8, wherein the second user input includes a single user input.

10. The method according to claim 1, wherein the source application is a calendar application.

11. The method according to claim 1, wherein the source application is an Internet browser.

12. The method according to claim 1, wherein the source application is a messaging application.

13. The method according to claim 1, wherein the event is a news event and the information includes news information.

14. The method according to claim 1, wherein said executing the query includes displaying the information on the main display unit.

15. A computer readable medium having computer-executable instructions for performing the steps recited in claim 1.

16. In a computer system including a host computer and first and second input/output devices, a method comprising:
    providing first information in a context at the first input/output device in response to a first user input;
    forming a query associated with providing the first information in said context at the first input/output device;
    responsive to a second user input, launching an application based on the query to provide second information in said context at the second input/output device, wherein the second user input identifies an input/output device type; and
    responsive to the second user input, determining that the second input/output device type is the closest input/output device to the first input/output device of the identified type.

17. The method according to claim 16, wherein the first and second input/output devices are remote peripheral devices.

18. The method according to claim 16, wherein the first input/output device is a remote peripheral device and the second input/output device is part of the host computer.

19. The method according to claim 16, wherein the second information includes richer content than the first information.

20. The method according to claim 16, wherein the application is a browser.

21. The method according to claim 16, wherein the application is a messaging application.

22. The method according to claim 21, wherein the information includes subject and author of a message.

23. The method according to claim 16, wherein the second user input is a single user input.

24. The method according to claim 16, wherein the first user input includes plural user inputs.

25. The method according to claim 16, wherein said forming the query includes translating the first user input into instructions understood by the host computer.

26. The method according to claim 16, wherein the first and second information are news information, the first information including a news story headline and only the second information including the news story.

27. The method according to claim 16, wherein the first and second information are news information, the first information including an abstract of a news story and only the second information including a full version of the news story.

28. A computer readable medium having computer-executable instructions for performing the steps recited in claim 16.

29. The method according to claim 16, wherein the query is a URL query string.

30. In a computer system including a host computer, a main user interface and a remote peripheral device associated with an auxiliary user interface, the remote peripheral device in communication with the host computer, a method comprising:

storing a sequence of activations input to the auxiliary user interface to obtain a context on the auxiliary interface;

building a query from the sequence of activations, the query being understood by the host computer; and responsive to a single activation input to the main user interface or the auxiliary interface, executing the query to provide the context on the main user interface.

31. The method according to claim 30, wherein the context is a browser context.

32. The method according to claim 30, wherein the context is in a messaging application context.

33. A computer readable medium having computer-executable instructions for performing the steps recited in claim 30.

* * * * *